(12) United States Patent
Dallmann

(10) Patent No.: US 6,681,308 B1
(45) Date of Patent: Jan. 20, 2004

(54) METHOD FOR AUTOMATICALLY CONVERTING BLOCK SIZE AND FORMATTING BACKEND FIBER CHANNEL DISCS IN AN AUTO INCLUSIVE STORAGE ARRAY ENVIRONMENT

(75) Inventor: Andrew Dallmann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 09/987,866

(22) Filed: Nov. 16, 2001

(51) Int. Cl.[7] .............................................. G06F 12/00
(52) U.S. Cl. ...................... 711/172; 711/114
(58) Field of Search ............................. 711/114, 172, 711/173; 713/100

(56) References Cited

U.S. PATENT DOCUMENTS 5,956,745 A * 9/1999 Bradford et al. ............ 711/137
6,571,362 B1 * 5/2003 Crater et al. ................ 714/701
2003/0023933 A1 * 1/2003 Duncan ....................... 714/807

* cited by examiner

Primary Examiner—Hiep T. Nguyen

(57) ABSTRACT

A method of block formatting a first data storage medium in or to be added to an array of data storage media to a desired block format is provided comprising the steps of sensing a current block format of the first data storage medium that is different from the desired block format, flagging the first data storage medium with the current block format different from the desired block format, and block formatting the flagged data storage media, wherein at least one of the step of sensing a current block format and the step of block formatting the flagged data storage media is based on a criteria.

36 Claims, 3 Drawing Sheets

METHOD FOR AUTOMATICALLY CONVERTING BLOCK SIZE AND FORMATTING BACKEND FIBER CHANNEL DISCS IN AN AUTO INCLUSIVE STORAGE ARRAY ENVIRONMENT

FIELD OF THE INVENTION

The present invention relates generally to an array of data storage media. More particularly, the present invention relates to a method of formatting a data storage medium in an array of data storage media.

BACKGROUND OF THE INVENTION

Conventional computer networks typically have at least one common data storage device for central data storage, such as the Hp SureStore Virtual Array 7100 by Hewlett Packard. The SureStore VA 7100 is one exemplary redundant array of independent discs (RAID) that employs a plurality of independent discs (e.g., fiber channel hard drives) in combination for fault tolerance and performance considerations. Conventional RAID arrays and other devices employing an array of data storage media suffer from inconsistent block formatting amongst the data storage media within the array. It should be appreciated that block formatting as utilized in the present specification refers to formatting the block size and/or block data content of a data storage medium, and can be broadly interpreted to include partitioning and/or data formatting.

Specifically, arrays of data storage media require a plurality of data storage media for storing data, each having a desired system block format. A specific block format is required to allow an operating system to appropriately define where data files stored on the array of data storage media begin and end. Conventional data storage media, however, are typically manufactured having predetermined block formats that may be different from the desired system block format. For example, standard 18 GB hard drives (part no. ST318451F) manufactured by Seagate come with a standard 512 byte block format. The SureStore VA 7100, however, requires a 520 byte block format to provide an eight byte checksum per 512 byes of stored data, which is used for various fault detection and error correction procedures. Thus, custom 520-byte data storage media have to be specially manufactured for systems with a non-standard block format, which adds to the cost of building the system.

One alternative method of integrating standard 512-byte drives into a 520-byte array, utilizes a drive block device, such as a JBOD (just a bunch of discs) directly attached to a host computer. A user then places a 512-byte drive into the JBOD, and utilizes the host computer to direct the JBOD to re-block format the 512-byte drive to a 520-byte drive. The re-block formatted 520-byte drive can then be introduced into a 520-byte array. Typically, a user must notify the array via a user interface (e.g., a keyboard) that an additional drive has been added, such as entering a particular value in a bios data field, drive manager, or the like. Not only is this method time consuming and labor intensive, it may require highly skilled operators to properly control the JBOD and configure the drive into the array. Furthermore, this method has to be repeated for each individual drive to be added to the array, which is extremely time consuming when manufacturing a new array from a plurality of drives each having a current block format different from the desired block format.

A need exists for a method of block formatting a data storage medium in or to be added to an array of data storage media. More particularly, a need exists for a method of automatically block formatting a data storage medium in or to be added to an array of data storage media and automatically introducing a newly block formatted drive into the array of data storage media.

SUMMARY OF THE INVENTION

The present invention provides an effective method of block formatting a data storage medium in or to be added to an array of data storage media.

According to one aspect of the present invention, a method of block formatting a first data storage medium in or to be added to an array of data storage media to a desired block format is provided comprising the steps of sensing a current block format of the first data storage medium that is different from the desired block format, flagging the first data storage medium with the current block format different from the desired block format, and block formatting the flagged data storage media, wherein at least one of the step of sensing a current block format and the step of block formatting the flagged data storage media is based on a criteria.

According to another aspect of the present invention, the method further comprises the steps of sensing a current block format of a second data storage medium, and flagging the second data storage medium if different from the desired block format, wherein the step of block formatting the flagged data storage medium block formats the first data storage medium and the second data storage medium substantially simultaneously.

According to another aspect of the present invention, the first data storage medium has a first data storage capacity and the second data storage medium has a second data storage capacity, the first data storage capacity being different from the second data storage capacity.

According to another aspect of the present invention, the method further comprises the step of sensing the block formatted data storage medium to verify that the block formatted data storage medium has the desired block format after the step of block formatting the flagged data storage media.

According to another aspect of the present invention, the method further comprises the step of adding the block formatted first data storage medium into the array.

According to another aspect of the present invention, the criteria is the completion of spin-up of all the data storage media in the array of data storage media.

According to another aspect of the present invention, the criteria is the introduction of a data storage medium into the array of data storage media.

According to another aspect of the present invention, the criteria is the removal of a data storage medium into the array of data storage media.

According to another aspect of the present invention, the criteria is a format control signal generated by an external source.

According to another aspect of the present invention, the step of flagging the first data storage medium notifies a topology manager to check the block format of all data storage media within the array.

According to another aspect of the present invention, the array of data storage media comprises a RAID array of data storage media.

According to another aspect of the present invention, the data storage medium comprises a hard drive.

According to another aspect of the present invention, the desired block format is 520bytes.

According to another aspect of the present invention, the current block format is 512bytes.

According to yet another aspect of the present invention, an array of data storage media having automatic data storage medium block formatting capability is provided comprising a plurality of data storage media, and a topology manager for monitoring the plurality of data storage media, the topology manager flagging data storage media having a block format that is different from a desired block format, wherein the array of data storage media block formats flagged data storage media based on a criteria.

According to yet another aspect of the present invention, a method of automatically block formatting a data storage medium in or to be added to an array of data storage media to a desired block format is provided comprising the steps of monitoring the array of data storage media, flagging a data storage medium having a current block format that is different from a desired block format, block formatting all flagged data storage media substantially simultaneously based on a criteria, and providing access to all of the block formatted data storage media. The criteria comprises at least one of completing spin-up of all the data storage media in the array of data storage media, providing a new data storage medium in the array of data storage media, removing a data storage medium from the array of data storage media, and receiving a format command from an external source.

According to yet another aspect of the present invention, a computer readable disc comprising machine readable program code is provided for causing a machine to perform the following method steps of sensing a current block format of a first data storage medium in or to be added to an array of data storage media, the first data storage medium having a block format that is different from a desired block format, flagging the first data storage medium with the current block format that is different from the desired block format, and block formatting the flagged data storage media based on a criteria.

DETAILED DESCRIPTION OF THE INVENTION

Figure 3:
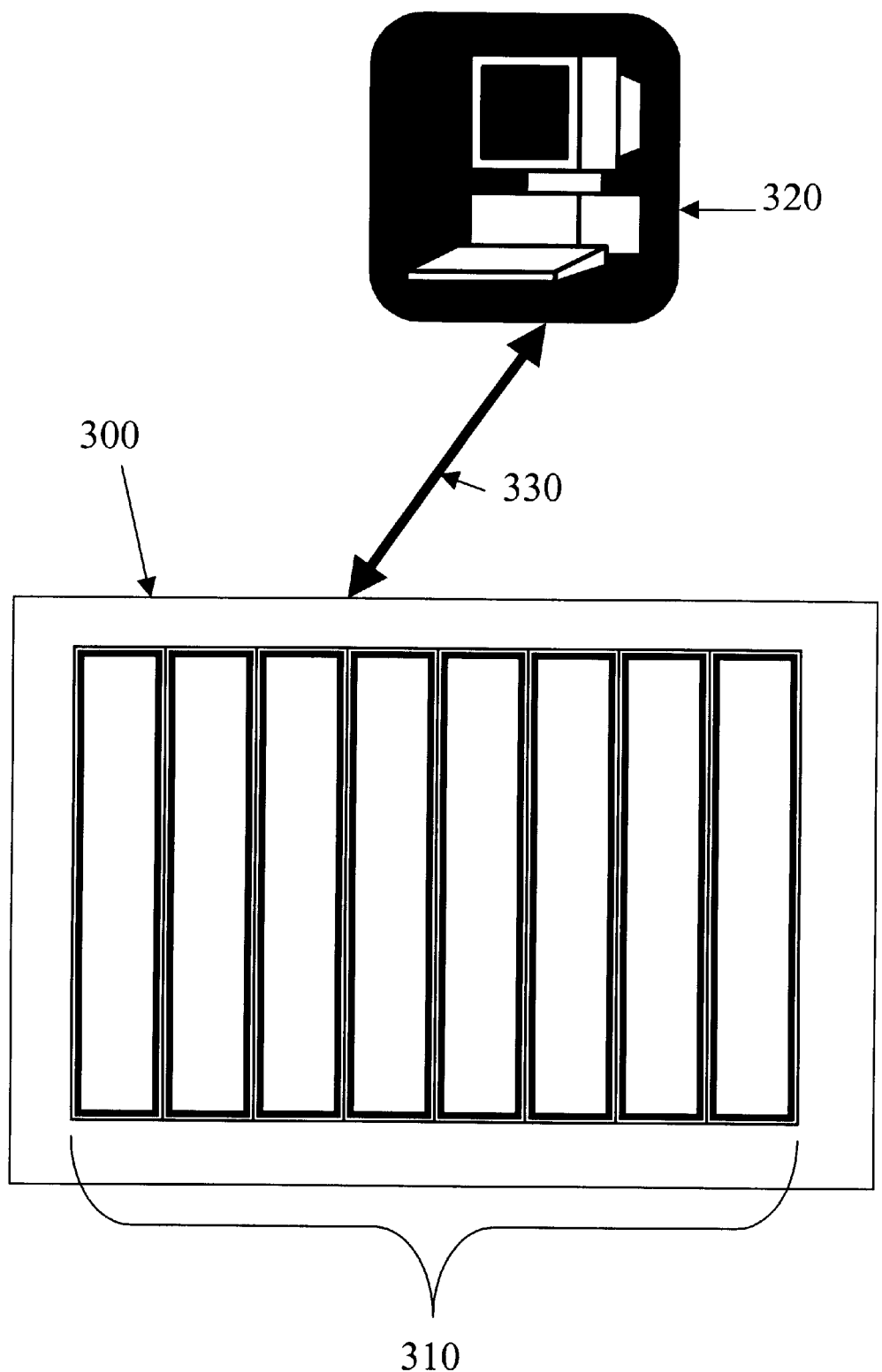
FIG. 3 is a block diagram of an array of data storage media according to another embodiment of the invention.

An exemplary RAID array of data storage media (an "array" hereinafter) 300 according to one aspect of the present invention is depicted in the block diagram of FIG. 3. The array 300 is accessible to a computer 320 via a link 330 (e.g., a network link). The computer 320 can store data on the array 300, and/or generate a block format control signal to initiate block formatting of a data storage medium (a "drive" hereinafter) 310 within the array 300. FIG. 3 shows eight drives 310, by way of example. As would be readily apparent to one skilled in the art, other array configurations may also be implemented. Thus, the RAID array of FIG. 3 is exemplary only, and is not limiting on the scope of the invention.

Furthermore, the term data storage media according to the present invention is intended to be interpreted broadly, including data storage media such as tapes, recordable CD-ROMS, fiber channel SCSI hard disc drives and other conventional hard disc drives, floppy discs, Jazz discs, and other data storage media as would be readily apparent to one skilled in the art, and is thus not intended to be limiting on the scope of the invention. For purposes of explanation only and not limiting on the present invention, embodiments of the present invention will be described below in reference to hard disc drives as are commonly implemented in a RAID array.

Figure 1:
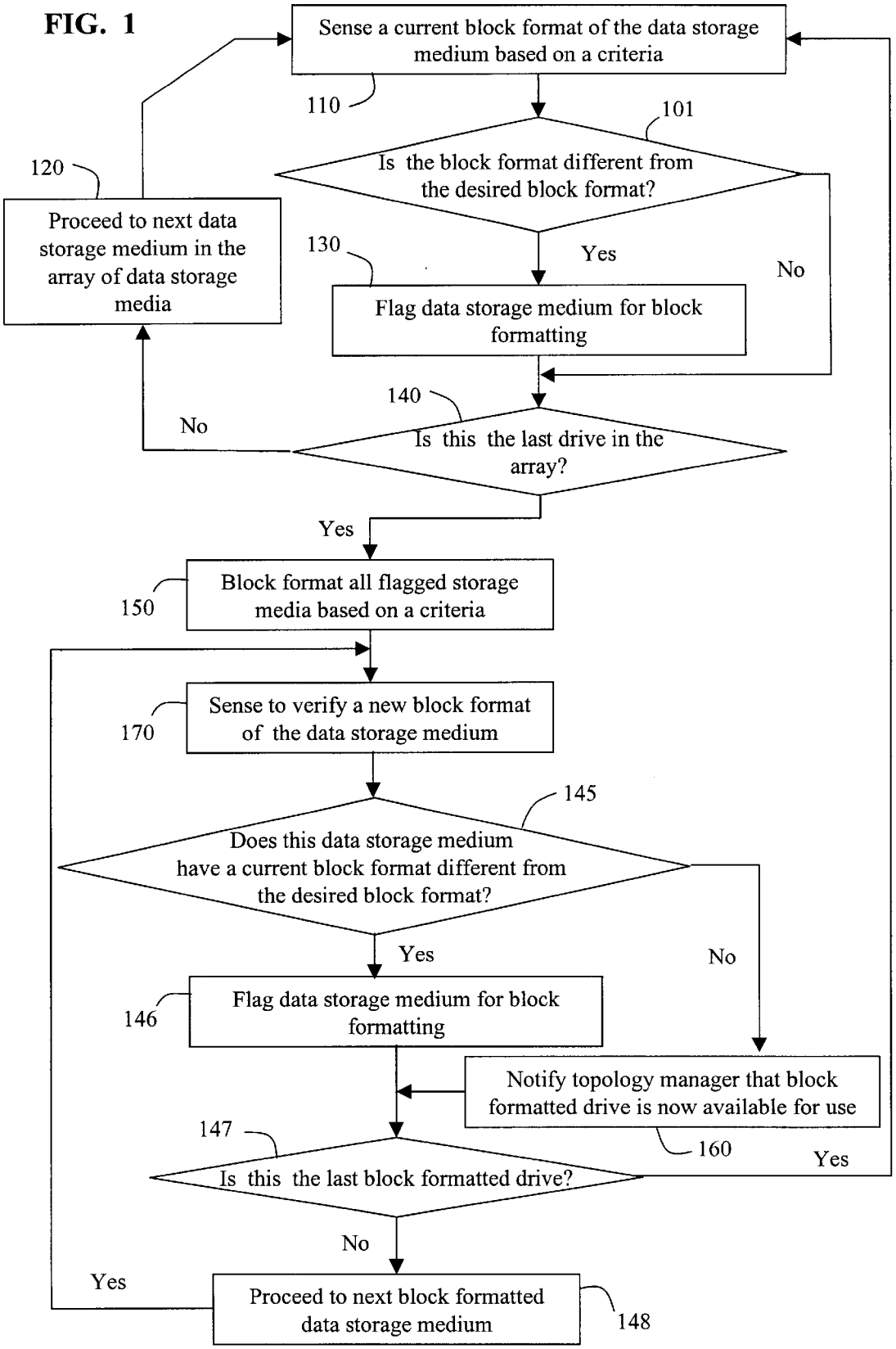
FIG. 1 is a flow chart for a method of block formatting a data storage medium in or to be added to an array of data storage media according to one embodiment of the invention.

FIG. 1 is a flow chart for a method of block formatting a drive in or to be added to an array according to one embodiment of the present invention. Continuously and/or at predetermined occasions or on an adhoc basis, the array senses a current block format of a drive in the array based on a criteria in step 110. The criteria, for example, can be the completion of drive spin-up for all the drives in the array, the introduction of a new drive in the array, the removal of a drive from the array, and/or a block format control signal generated by an external source as well as other criteria as would be readily apparent to one skilled in the art. If the array senses that the current block format of the drive is different than a desired block format in step 101, the drive is flagged for block formatting in step 130. Flagging, for example, may comprise making a data entry in a memory that contains a listing of all the drives in the array. Optionally, in a preferred embodiment the array then determines if the sensed drive is the last drive in the array in step 140. If the sensed drive is not the last drive in the array, the array proceeds to the next drive in the array in step 120. Thus, steps 110, 120, 130, and 140 may be repeated to scan all of the drives within the array.

After all drives in the array have been scanned, the array block formats all of the flagged drives based on a criteria in step 150. The criteria for step 150 may be the same criteria as aforementioned with respect to step 110, or can be eliminated to automatically block format immediately after determining that all drives in the array have been scanned. Block formatting in step 150 may be done individually (i.e., one flagged drive at a time), or can be completed substantially simultaneously for all of the flagged drives to reduce the total block formatting time. As each flagged drive in the array may have a different data storage capacity (e.g., one drive may have a 1 GB storage capacity and another drive may have a 75 GB storage capacity), the flagged drives may complete simultaneous block formatting in step 150 at different time periods, wherein drives having a large data storage capacity take longer to block format than drives with a small data storage capacity.

As each flagged drive individually completes block formatting (alternatively after all flagged drives complete block formatting), the array senses the current block format of each drive in the array in step 170 to verify that the block formatted drive has the desired block format. If the drive has a current block format that is different from the desired block format determined in step 145, the array flags the data storage medium in step 146 for block formatting, which is similar in function to step 130. If the drive has the desired block format, a topology manager is notified that the block formatted drive is now available for use in step 160. The topology manager may include and/or have access to a memory that contains a listing of all the drives in the array (e.g., the same one used in the flagging steps 130 and/or 146), preferably with a field for indicating that a specific drive is or is not block formatted to the desired block format.

The array then determines if this is the last block formatted drive in step 147, and proceeds to the next block formatted drive in step 148 if it is not. After all of the block formatted drives have been scanned, the array then proceeds back to step 110 to sense a current block format of a drive based on a criteria. If desired, the criteria for step 110 may include at least one of the block formatted drives being flagged in step 146.

An array having automatic block formatting capability according to the above described embodiment has the advantage of allowing automatic integration of new drives with current block formats different than a desired block format. Thus, proprietary/custom drives are not required to manufacture arrays having non-standard data block formats. Further, the drive block formatting can be done automatically, without requiring any substantial user interaction and can automatically re-initiate when any one of a number of criteria is satisfied (e.g., new drive introduction, drive removal, array initiation, etc.). Automatic drive block formatting thus drastically reduces the amount of required user input.

Optionally, the criteria for steps 150 and/or step 110 may include block formatting when a corrupt drive is detected or "on the fly" changes in the block format of the array are desired. These implementations, however, may require additional considerations to address data loss issues (e.g., partial data recovery) and other related concerns. Thus, a user changing operating systems or performing any other task requiring a change in drive block format, can easily change block formats without having substantial involvement in controlling the block formatting operation.

Figure 2:
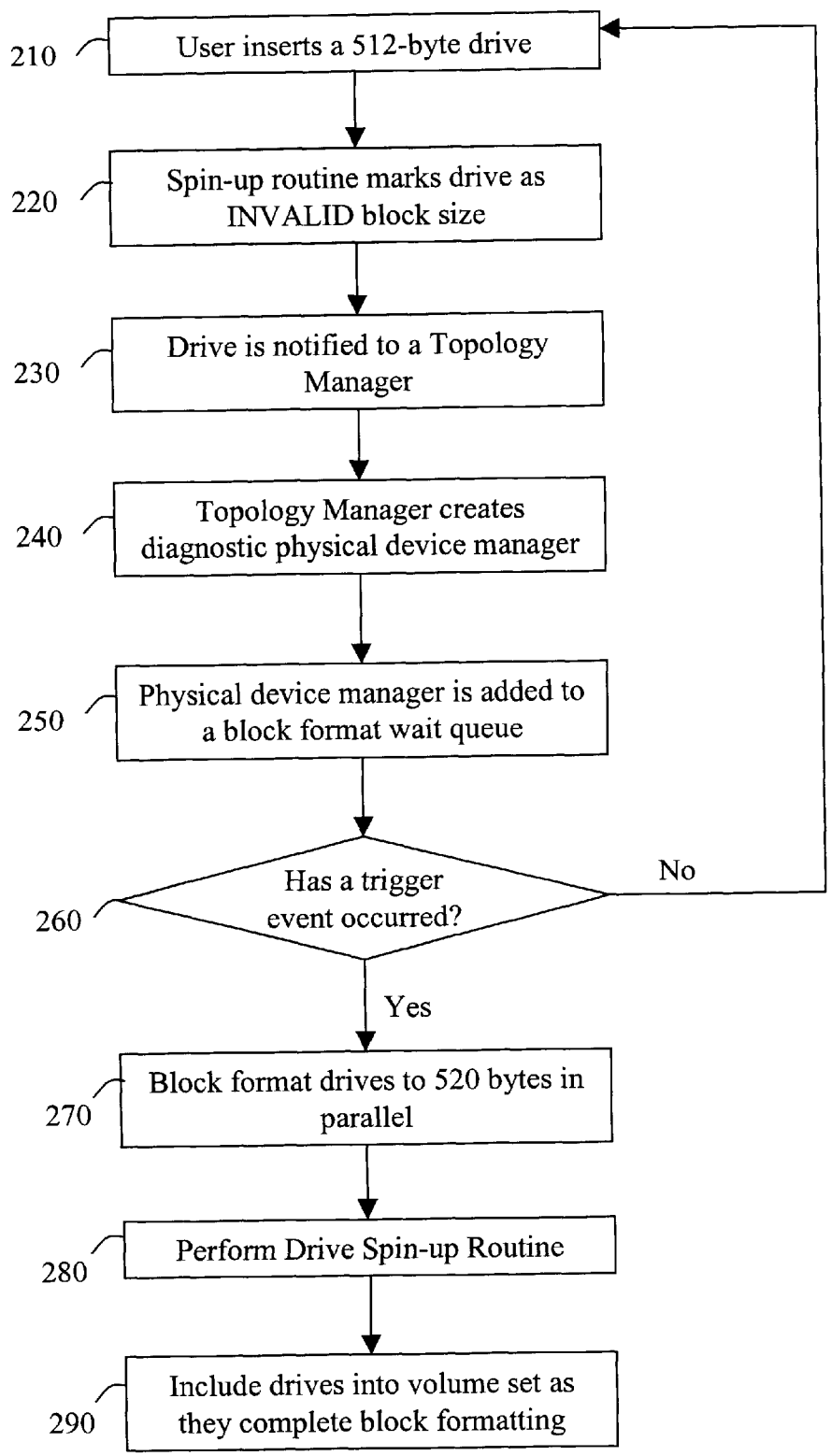
FIG. 2 is a flow chart for a method of block formatting a data storage medium in or to be added to an array of data storage media according to another embodiment of the invention.

FIG. 2 is a flow chart for a method of block formatting a drive in or to be added to an array according to another embodiment of the present invention. FIG. 2 will be described in reference to a user inserting a 512-byte default block formatted drive in step 210 into an array having a desired 520-byte block format, as an exemplary criteria. Other criteria for initiating automatic drive block formatting as indicated in previously described embodiments may also be used, as would be readily apparent to one skilled in the art.

After a user inserts a 512-byte drive into an array in step 210, the array proceeds to spin-up the drive in step 220. Typically, the spin-up routine utilized in step 220 includes physically rotating components within the drive (e.g., a 4500 revolutions per minute (rpm) drive rotates 4500 times in a given minute during drive access) from a stationary non-rotating condition to a full speed (e.g., 4500 rpm) rotating condition. As the drive gets up to full speed, a topology manager or other similar overhead management device within the array scans the drive for various parameters. These parameters may include net storage capacity, read/write access speeds, vendor drive ID, unique drive identifier, drive firmware revision and current drive block format. Optionally, these parameters can include scanning for viruses, which may require additional software for implementation. As the drive inserted in step 210 has a 512-byte block format which is different than the desired 520-byte block format, the spin-up routine marks the drive as having an INVALID block size in step 220.

The topology manager is notified in step 230 of each drive that has an INVALID block size determined in at least step 220. The topology manager then may create a diagnostic physical device manager in step 240, to monitor parameters corresponding to a particular drive (e.g., a drive marked INVALID in step 220). A physical device manager can be implemented using accessible memory locations within the firmware of the RAID that stores data information on a given drive. Further, typical physical device manager implementations provide for functional methods of interacting with and manipulating the drive data, as commonly performed using object oriented programming (combination of data storage and method of interacting with stored data). The physical device manager for each INVALID drive is added to a block format wait queue in step 250, where it sits until a trigger event occurs in step 260.

Trigger events may include events such as the completion of spin up of all the drives in the array, the introduction of a new drive in the array, the removal of a drive from the array, and/or the reception of a block format control signal generated by an external source. Once the trigger event occurs in step 260, the array block formats all drives with a current block format (i.e., 512-byte block format) that is different from the desired block format (i.e., 520byte-block format) substantially simultaneously, thereby saving time over systems that block format each drive sequentially. Alternatively, the array may block format all drives with a current block format (i.e., 512-byte block format) that is different from the desired block format (i.e., 520byte-block format) individually if so desired.

The block formatted drives, or alternatively all the drives in the array, may then go through a spin-up routine in step 280 similar to the spin up routine in step 220. Every block formatted drive newly having the desired block format are then included into the volume set in step 290. Step 290 may be achieved, for example, by having the diagnostic physical device manager notify the topology manager that a specific drive now has the desired data block format.

As various drives may have different storage capability and thus take different times to block format in step 270, steps 280 and 290 may be performed individually when a given drive completes block formatting in step 270, or step 290 may be performed when all of the drives have completed the spin-up routine in step 280.

An array having a data block formatting capability according to the above described method has all of the advantages of the previously described embodiment, and further allows for additional drive parameter monitoring in the topology manager and/or diagnostic physical device manager. As would be readily apparent to one skilled in the art, the particular order of the steps and additional steps may be altered depending on the given implementation.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen in generally on designer choice. It is understood that all such variations are within the scope of the invention. Likewise, software and web implementation of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

What is claimed is:

1. A method of block formatting a first data storage medium in or to be added to an array of data storage media to a desired block format comprising the steps of:

sensing a current block format of said first data storage medium that is different from said desired block format;

flagging said first data storage medium with said current block format different from said desired block format; and block formatting said flagged data storage media, wherein at least one of the step of sensing a current block format and the step of block formatting said flagged data storage media is based on a criteria.

2. The method of claim 1, further comprising the steps of:

sensing a current block format of a second data storage medium; and flagging said second data storage medium if different from said desired block format, wherein the step of block formatting said flagged data storage medium block formats said first data storage medium and said second data storage medium substantially simultaneously.

3. The method of claim 2, wherein said first data storage medium has a first data storage capacity and said second data storage medium has a second data storage capacity, said first data storage capacity being different from said second data storage capacity.

4. The method of claim 1, further comprising the step of: sensing said block formatted data storage medium to verify that said block formatted data storage medium has said desired block format after the step of block formatting said flagged data storage media.

5. The method of claim 1, further comprising the step of: adding said block formatted first data storage medium into said array.

6. The method of claim 1, wherein said criteria is the completion of spin-up of all the data storage media in said array of data storage media.

7. The method of claim 1, wherein said criteria is the introduction of a data storage medium into said array of data storage media.

8. The method of claim 1, wherein said criteria is the removal of a data storage medium into said array of data storage media.

9. The method of claim 1, wherein said criteria is a format control signal generated by an external source.

10. The method of claim 1, wherein the step of flagging said first data storage medium notifies a topology manager to check the block format of all data storage media within said array.

11. The method of claim 1, wherein said array of data storage media comprises a RAID array of data storage media.

12. The method of claim 1, wherein said data storage medium comprises a hard drive.

13. The method of claim 1, wherein said desired block format is 520bytes.

14. The method of claim 1, wherein said current block format is 512bytes.

15. An array of data storage media having automatic data storage medium block formatting capability, comprising:

a plurality of data storage media; and a topology manager for monitoring said plurality of data storage media, said topology manager flagging data storage media having a block format that is different from a desired block format, wherein said array of data storage media block formats flagged data storage media based on a criteria.

16. The array of claim 15, wherein at least one data storage medium has a different data storage capacity than another data storage medium within said array.

17. The array of claim 15, wherein said criteria is the completion of spin-up of all the data storage media in said array of data storage media.

18. The array of claim 15, wherein said criteria is the introduction of a new data storage medium into said array of data storage media.

19. The array of claim 15, wherein said criteria is the removal of a data storage medium from said array of data storage media.

20. The array of claim 15, wherein said criteria is a format control signal generated by an external source.

21. The array of claim 15, wherein said array of data storage media comprises a RAID array.

22. The array of claim 15, wherein said plurality of data storage media comprises a plurality of hard drives.

23. The array of claim 15, wherein said topology manager verifies that a block formatted data storage medium has said desired block format.

24. A method of automatically block formatting a data storage medium in or to be added to an array of data storage media to a desired block format comprising the steps of:

monitoring said array of data storage media;

flagging a data storage medium having a current block format that is different from a desired block format;

block formatting all flagged data storage media substantially simultaneously based on a criteria, said criteria comprising at least one of:

completing spin-up of all the data storage media in said array of data storage media;

providing a new data storage medium in said array of data storage media;

removing a data storage medium from said array of data storage media; and receiving a format command from an external source; and providing access to all of said block formatted data storage media.

25. The method of claim 24, wherein said array of data storage media comprises a RAID array of data storage media.

26. The method of claim 24, wherein said data storage medium comprises a hard drive.

27. The method of claim 24, further comprising the step of: sensing said block formatted data storage medium to verify that said block formatted data storage medium has said desired block format after block formatting all flagged data storage media simultaneously based on a criteria.

28. A computer readable disc comprising machine readable program code for causing a machine to perform the following method steps:

sensing a current block format of a first data storage medium in or to be added to an array of data storage media, said first data storage medium having a block format that is different from a desired block format;

flagging said first data storage medium with said current block format that is different from said desired block format; and block formatting said flagged data storage media based on a criteria.

29. The computer readable disc of claim 28, wherein said computer readable program code further causes a machine to perform the following method steps:

sensing a current block format of a second data storage medium; and flagging said second data storage medium if different from said desired block format, wherein the step of block formatting said flagged data storage medium based on a criteria block formats said first data storage medium and said second data storage medium substantially simultaneously.

30. The computer readable disc of claim 28, wherein said computer readable program code further causes a machine to perform the following method step: sensing said block formatted data storage medium to verify that said block formatted data storage medium has said desired block format after block formatting all flagged data storage media substantially simultaneously based on a criteria.

31. The computer readable disc of claim 28, wherein said computer readable program code further causes a machine to perform the following method step: adding said block formatted first data storage medium into said array of data storage media.

32. The computer readable disc of claim 28, wherein said criteria is the completion of spin-up of all the data storage media in said array of data storage media.

33. The computer readable disc of claim 28, wherein said criteria is the introduction of a data storage medium in said array of data storage media.

34. The computer readable disc of claim 28, wherein said criteria is the removal of a data storage medium from said array of data storage media.

35. The computer readable disc of claim 28, wherein said criteria is a format control signal generated by an external source.

36. The computer readable disc of claim 28, wherein the step of flagging said first data storage medium notifies a topology manager to check the block format of all data storage media within said array of data storage media.

* * * * *